United States Patent
Stevenson

(10) Patent No.: US 8,679,605 B2
(45) Date of Patent: Mar. 25, 2014

(54) PEELABLE CHILD RESISTANT PHARMACEUTICAL BLISTER LIDSTOCK

(75) Inventor: James Stevenson, Alcoa Center, PA (US)

(73) Assignee: Pactiv LLC, Lake Forest, IL (US)

( * ) Notice: Subject to any disclaimer, the term of this patent is extended or adjusted under 35 U.S.C. 154(b) by 0 days.

(21) Appl. No.: 11/688,803

(22) Filed: Mar. 20, 2007

(65) Prior Publication Data

US 2007/0224379 A1    Sep. 27, 2007

Related U.S. Application Data

(60) Provisional application No. 60/784,818, filed on Mar. 21, 2006.

(51) Int. Cl.
*B32B 1/02* (2006.01)
*B32B 1/04* (2006.01)
*B32B 1/06* (2006.01)
*B32B 27/36* (2006.01)

(52) U.S. Cl.
USPC ....... 428/35.9; 428/35.7; 428/35.8; 428/36.4; 428/36.6; 428/36.7; 428/480

(58) Field of Classification Search
USPC ........... 428/34.1, 35.2, 35.3, 35.4, 35.7, 35.8, 428/35.9, 36.4, 36.6, 480, 482, 483, 36.7
See application file for complete search history.

(56) References Cited

U.S. PATENT DOCUMENTS

| | | | |
|---|---|---|---|
| 3,921,805 A | 11/1975 | Compere | |
| 4,567,986 A | 2/1986 | Eastwood | |
| 4,871,784 A * | 10/1989 | Otonari et al. | 521/138 |
| 5,372,268 A * | 12/1994 | Han | 215/232 |
| 5,469,968 A * | 11/1995 | Matthews et al. | 206/532 |
| 5,527,616 A | 6/1996 | Hatano et al. | |
| 5,560,490 A | 10/1996 | Chawla | |
| 5,908,527 A * | 6/1999 | Abrams | 156/277 |
| 6,113,927 A * | 9/2000 | Hatakeyama | 424/401 |
| 6,270,869 B1 * | 8/2001 | Zeiter et al. | 428/35.8 |
| 6,308,853 B1 * | 10/2001 | Jud | 220/359.3 |
| 6,516,949 B2 | 2/2003 | Fuller et al. | |
| 7,192,640 B2 * | 3/2007 | Holbert et al. | 428/349 |
| 7,316,317 B2 * | 1/2008 | Harper | 206/532 |
| 2004/0081840 A1 | 4/2004 | Kiehne et al. | |
| 2004/0224117 A1 | 11/2004 | Amano | |
| 2005/0103678 A1 | 5/2005 | Clark et al. | |
| 2005/0139505 A1 | 6/2005 | Miller et al. | |
| 2005/0205451 A1 | 9/2005 | Brown-Skrobot et al. | |
| 2005/0208242 A1 | 9/2005 | Smelko et al. | |
| 2006/0014036 A1 | 1/2006 | Kendig et al. | |
| 2006/0040076 A1 | 2/2006 | Franzyshen et al. | |

FOREIGN PATENT DOCUMENTS

| | | |
|---|---|---|
| JP | 09-066682 | 3/1997 |
| WO | WO2004/041672 | 5/2004 |

OTHER PUBLICATIONS

International Search Report from PCT/US2007/064525, Feb. 1, 2008.

* cited by examiner

*Primary Examiner* — Walter B Aughenbaugh
(74) *Attorney, Agent, or Firm* — Woods Oviatt Gilman LLP; Katherine H. McGuire, Esq.

(57) ABSTRACT

A peelable lidstock for use with a child resistant pharmaceutical blister is disclosed. The lidstock includes a first layer of white polyester, a second layer of adhesive, a third layer of foil, and a fourth layer of heat seal. The lidstock is strong and provides excellent child resistance and a broad sealing window which facilitates manufacture.

25 Claims, 5 Drawing Sheets

PEELABLE CHILD RESISTANT PHARMACEUTICAL BLISTER LIDSTOCK

This application claims the benefit of priority to U.S. Provisional Application Ser. No. 60/784,818, filed on Mar. 21, 2006 and entitled "Peelable Child Resistant Pharmaceutical Blister Lidstock", which is incorporated by reference in the present application in its entirety.

BACKGROUND

1. Field

The present disclosure relates to a lidstock material suitable for making or fortifying closures, such as lids for pharmaceutical blisters. More particular embodiments include an improved lidstock for use with a child resistant, peel-push pharmaceutical blisters.

2. Background

Individual units of consumables sometimes require segregated packaging for dispensing. For example, medicine and pharmaceutical are often best housed, marketed and dispensed when needed using special packaging such as "blister packs," each blister of which contains an individual pill. One necessary aspect of such packaging is to provide child resistance or childproofing to prevent children from easily accessing the medicine inside. With the use of such packaging, children are unable to bite through the packaging and ingest the medicine inside the package. However, the product must still be accessible to adults to permit using the medicine in the packaging.

There exists several types of packaging to provide a pharmaceutical product with child resistance. The traditional peel-push safety packaging provides a lidding having multiple layers. The multiple layers include a top paper layer allowing for printing, an adhesive layer, a nylon or polyester film layer, a release adhesive layer, foil and then a heat seal coating. The traditional packaging was sealed to a thermoformed poly-vinyl chloride blister and then opened by peeling the release adhesive layer and pushing the pharmaceutical product through the foil.

One problem that exists with such a structure is that it peels inconsistently. The structure has multiple layers being pulled away causing the structure to tear easily. It becomes more difficult to open the packaging and obtain the pharmaceutical product out of the packaging for use.

Additionally, the traditional structures have a narrow sealing window. Therefore, high seal temperatures are required to seal the lidding to the blister. Rotary and platen machines are used. Rotary machines have shorter dwell times and, thus, are less efficient with materials that have a narrow sealing window. As a result, there are often mis-seals, over-seals and damage to the package during the sealing process.

Also, the manufacturing of containers involving multiple layers of differing materials can be more cumbersome, slower, and complex than is ideal.

Thus, there is a need to provide an improved lidstock for pharmaceutical blisters that has increased burst and puncture strength for child resistance, and a lower sealing temperature. An ideal solution would also simplify the process of manufacture and/or the number of materials or feedstocks needed to efficiently and quickly produce such containers.

SUMMARY

In one aspect of the present disclosure, there exists an improved lidstock for use with a pharmaceutical blister. The lidstock comprises four layers, a top layer of white polyester, a layer of adhesive, a layer of foil, and a layer of heat seal to seal the lidstock to the pharmaceutical blister.

In exemplary embodiments, the top layer of white polyester has a thickness of about 0.002 inches. In particular embodiments, a primer applied to the top side of white polyester allows for printing on the packaging.

In particular embodiments, the lidstock is sealed to a polyvinyl chloride blister. In another embodiment, the lidstock is sealed to a blister sheet comprising a plurality of blister packs on a singe sheet. The lidstock is manufactured via lamination and heat seal coating applications.

In some embodiments, the adhesive layer is a peelable. In this embodiment, the top layer of blister pack utilizing the lidstock would be peeled away, and the product pushed through the remaining layers. In other embodiments, the adhesive layer is non-peelable and the heat seal is peelable. In this embodiment, the entire lidstock would be pulled away from the blister pack. In still other embodiments, none of the layers of the lidstock are peelable. In this embodiment, the lidstock would need to be punctured with a sharp tool.

In another aspect of the present disclosure, a lidstock offering improved mullen burst strength is disclosed. In an exemplary embodiment, the mullen burst strength of the lidstock material is about 135 to 145 pounds per square inch. In particular embodiments, the mullen burst strength of the lidstock material is about 140.7 pounds per square inch.

In another aspect of the present disclosure, a lidstock offering increased puncture resistance is disclosed. In an exemplary embodiment, the puncture resistance of the lidstock is about 45 to 55 pounds. In an exemplary embodiment, the puncture resistance of the lidstock is about 50 pounds.

In another aspect of the present disclosure a method of providing a pharmaceutical blister is disclosed. The formation of the disclosed lidstock has a broader sealing window than traditional lidstock materials. As a result, manufacturing of the lidstock to the pharmaceutical blister is completed at much lower sealing temperatures, and thereby increases efficiency and reduces costs.

DRAWINGS

The foregoing aspects and advantages of present disclosure will become more readily apparent and understood with reference to the following detailed description, when taken in conjunction with the accompanying drawings, wherein.

DETAILED DESCRIPTION

In accordance with this disclosure, a lidstock is provided for a peel-push blister package. A lidstock having a first strong layer is applied to the back of a blister sheet, enclosing a pharmaceutical product in the blister. The strong layer prevents the pharmaceutical product in the blister from being removed until this layer is peeled away. The lidstock comprises an additional layer that the product can be forced though after the strong layer is removed. This layer helps to protect from the environment. A heat seal is used to apply the lidstock to the package.

Figure 1:
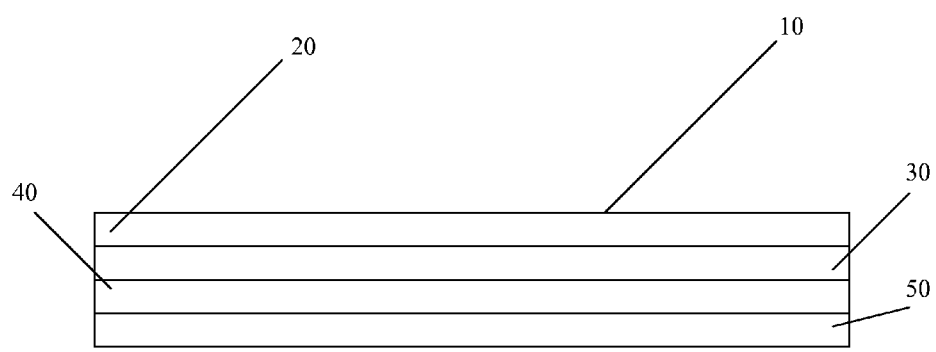
FIG. 1 illustrates the structure of an exemplary lidstock for use with pharmaceutical blisters.

The structure of an exemplary lidstock 10 is illustrated in FIG. 1. The lidstock 10 has a first layer 20 comprising white polyester, a second layer 30 of an adhesive, a third layer 40 of foil, and a fourth layer 50 of a heat seal coating.

In a particular embodiment, the first layer 20 has a thickness of about 0.002 inches. The first layer 20 is formed from a film of a strong polymer that prohibits pushing or forcing the medicine or pill through the first layer 20.

In exemplary embodiments, a white polyester film is utilized for the first layer 20 of the structure. The white polyester layer comprises a pigmented polyester film with a printable primer applied to the top side. Utilization of a white polyester layer allows printing on the primer for informational purposes on the back of the packaging without need for a further paper layer. White polyester also exhibits enough strength to prevent the pharmaceutical product from being pushed or forced through the layer.

In particular embodiments, the second layer 30 comprises a peelable release adhesive. Any adhesives may be utilized to seal the first layer to the second layer. For example, 2 component urethane may be utilized as the adhesive layer.

In exemplary embodiments, the weight of the second layer 30 adhesive is between about 0.6 and 1.4 pounds per Ream. In a particular embodiment, the weight of the adhesive layer is about 1.0 pounds per Ream.

In exemplary embodiments, a third layer 40 comprises a foil layer with a thickness of about 0.0008 to about 0.001 inches. In a particular embodiment, the foil layer has a thickness of 0.001 inches. This thickness of the foil layer allows a pill to be pushed through the packaging after the first layer 20 is peeled away. The foil layer also prevents moisture from entering the blister.

The third layer 40 may be comprised of a metal foil. For example, aluminum foil may be utilized. In exemplary embodiments, a 1200 series aluminum alloy is used for the third layer 40. In particular embodiments, "O" Temper or "H" Temper aluminum is utilized.

The fourth layer 50 may be comprised of heat seal. In exemplary embodiments, vinyl acrylic heat seal coating may be utilized. The heat seal coating should weigh between about 3 to 5 pounds per Ream. In particular embodiments, the heat seal coating weighs about 4 pounds per Ream.

Figure 2:
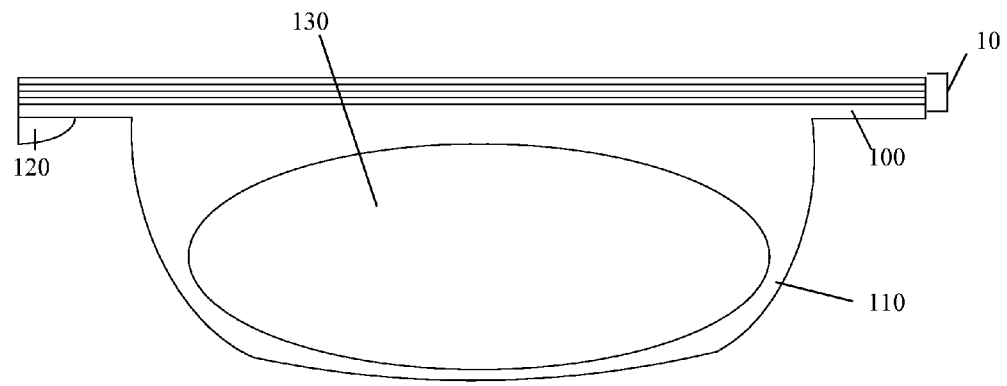
FIG. 2 illustrates the a pharmaceutical blister pack with the lidstock sealed to the top for child resistance to the pharmaceutical product and protection from the environment.
Figure 3:
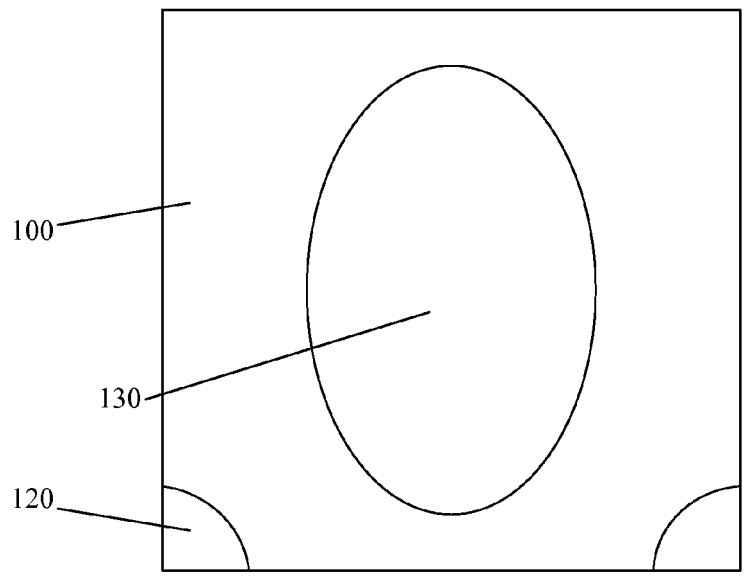
FIG. 3 illustrates an overhead view of the pharmaceutical blister pack.

An exemplary embodiment of the pharmaceutical blister pack with a base sheet 100 is illustrated in FIG. 2 and 3. The base sheet 100 comprises poly-vinyl chloride in exemplary embodiments. In other embodiments, the base sheet 100 could also comprise a lamination of polychlorotrifluoroethylene to poly-vinyl chloride or a cold form blister material comprising nylon, foil, or poly-vinyl chloride lamination. At least one blister 110 is formed into the base sheet 100 and a pharmaceutical product 130 is placed in the blister 110.

The lidstock 10 is heat sealed to the to the base sheet 100 enclosing the pharmaceutical product 130 in the blister 110. The base sheet 100 includes a tab 120 that is not sealed to the lidstock material 10 enabling a user to grip the lidstock material and peel the first layer 20 at the peelable layer. In some embodiments, the peelable layer is the second layer 30 wherein the second layer is a peelable adhesive.

In other exemplary embodiments, the second layer 30 may be comprised of a non-peelable adhesive and the fourth layer 50 may be comprised of peelable heat seal. In this embodiment, the entire lidstock 10 would be peeled away. In still other embodiments, none of the layers of the lidstock 10 are peelable. In this embodiment, scissors or another tool would need to be utilized to break open the lidstock 10.

Figure 4:
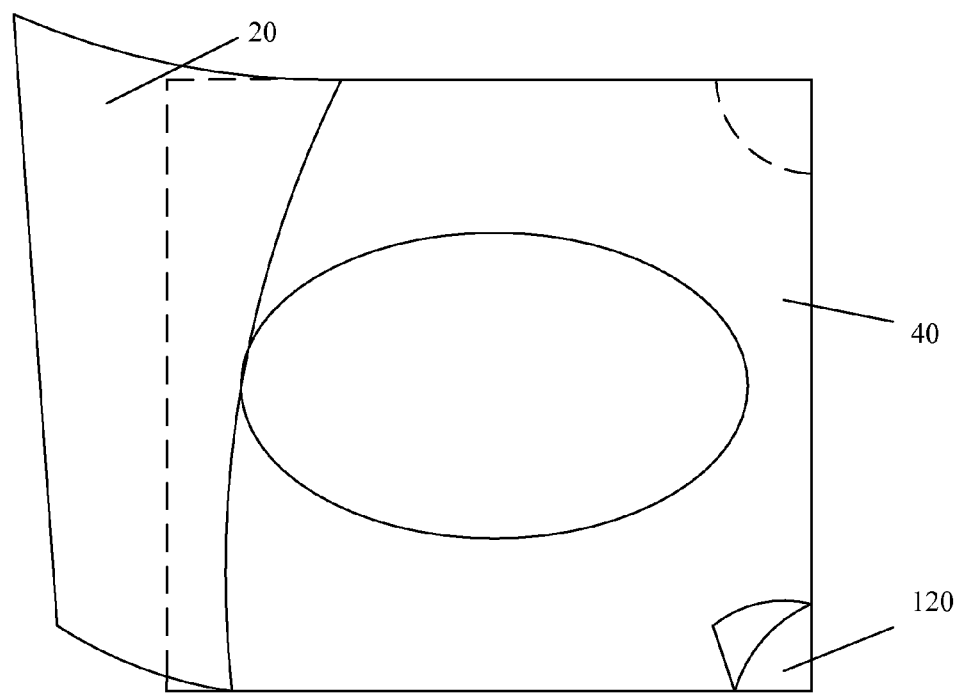
FIG. 4 illustrates the bottom of the blister pack with peelable portion of the lidstock peeled away.

FIG. 4 illustrates a exemplary blister pack having the first layer 20 peeled away at the release adhesive second layer 30. The third layer 40 remains sealed to the base sheet 100. To access the pharmaceutical product 130 enclosed in the blister 110, a user would force the product through the third layer 40.

Figure 5:
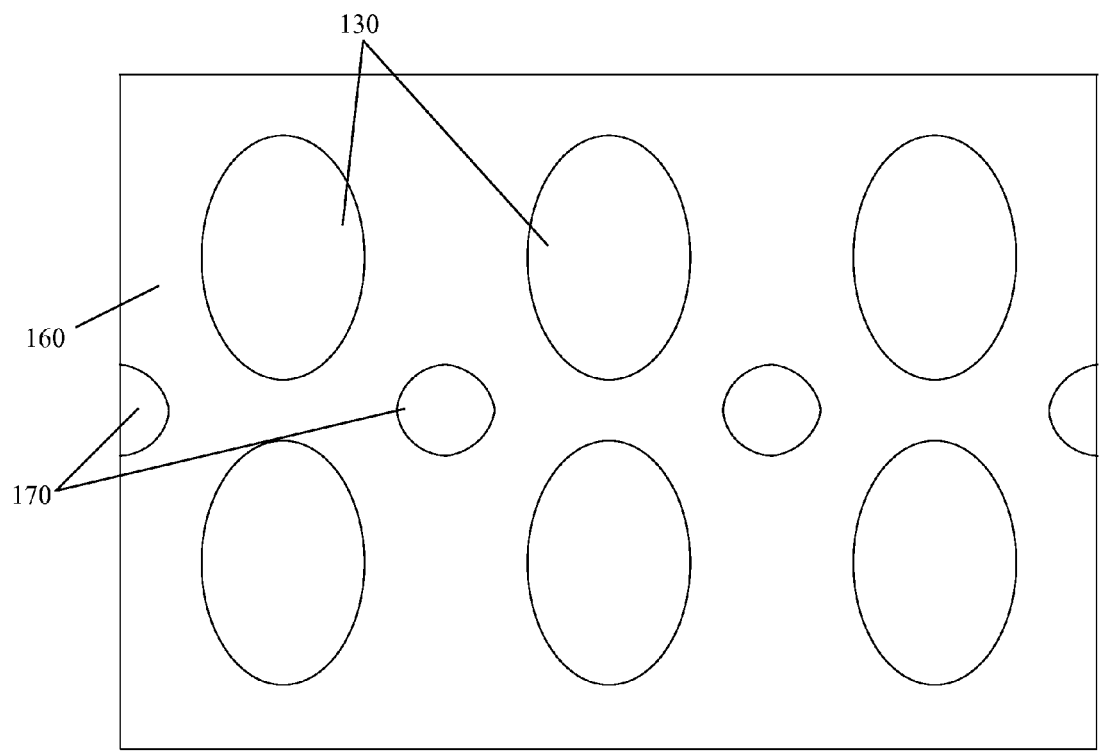
FIG. 5 illustrates an overhead view of blister sheet containing a plurality of the blister packs.

A blister sheet 160 is illustrated in FIG. 5. In this embodiment, the blister sheet 160 is manufactured and formed with a plurality of blisters 130. A plurality of tab blisters 170 are also formed on the blister sheet 160 to provide for a tab when the blister sheet 160 is split into individual blister packs. The lidstock material is bonded to a base sheet of poly-vinyl chloride on the blister sheet 160.

Figure 6:
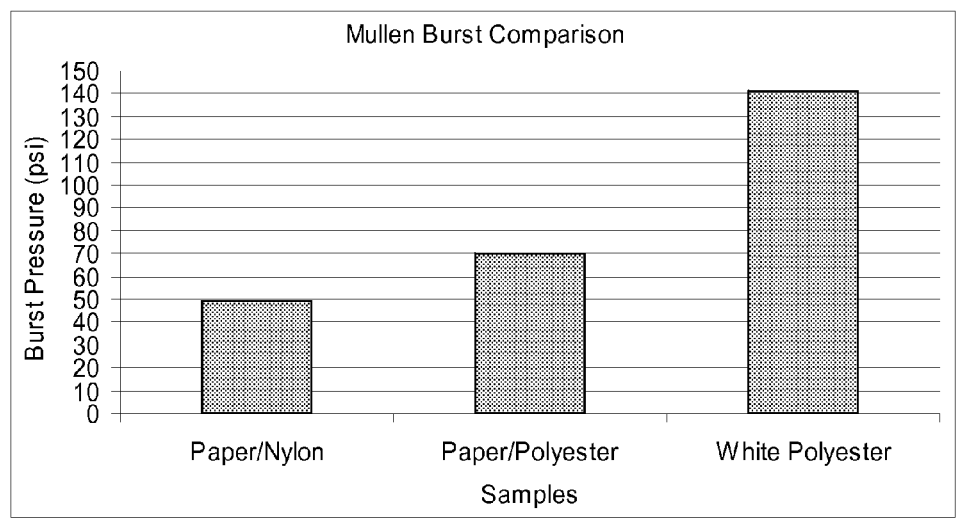
FIG. 6 illustrates the improved mullen burst strength of the disclosed lidstock compared to traditional lidstocks.

The lidstock structure disclosed herein is stronger than the lidstocks used in traditional blister packages. To show the strength of the disclosed lidstock, the mullen burst strength of the disclosed exemplary lidstock, and the traditional lidstocks using polyester and nylon. To measure mullen burst strength, pressure is applied to the material in one of two ways, either a 'ball' is pushed into the fabric sample or the sample is clamped onto a device and inflated with oil. The force required to burst through is the mullen burst strength. Mullen burst strength is measured in units of force per unit area (psi). FIG. 6 illustrates the mullen burst strength for the three lidstocks.

FIG. 6 illustrates that the mullen burst strength for the disclosed lidstock utilizing white polyester is much greater than the traditional blister lids. The exemplary lidstock has a mullen burst strength of 140.7 psi compared to 70 psi for the traditional nylon structure and 49.3 for the traditional polyester lidstock. The disclosed exemplary lidstock is therefore better suited as child resistant structure than previous lids for blister packages.

The puncture strength of the exemplary lidstock and the traditional structures were also examined. A piercing needle test was performed FIG. 7 illustrates the puncture strength samples of the lidstocks.

Figure 7:
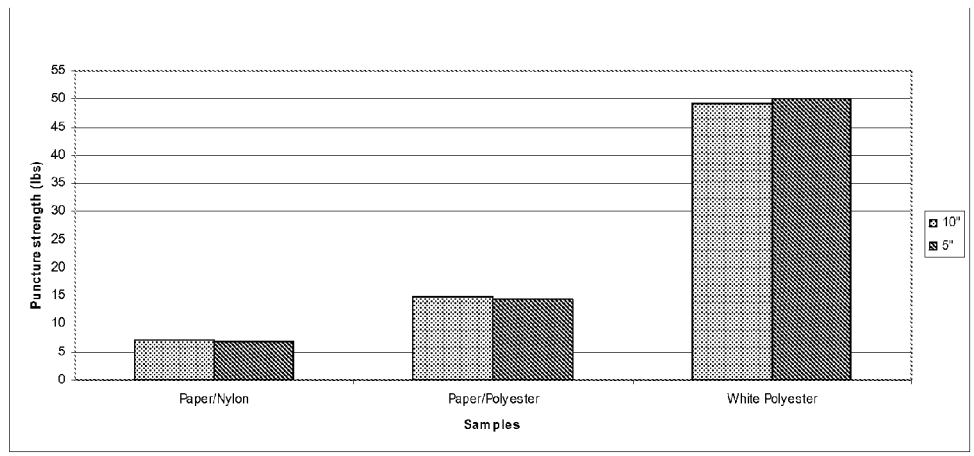
FIG. 7 illustrates the puncture strength of the disclosed lidstock compared to traditional lidstocks.

As seen from FIG. 7, the puncture strength of the white polyester lidstock is about 50 pounds compared to about 7 pounds and about 15 pounds for the traditional polyester and nylon lidstocks respectively. By providing better puncture strength than other strucutres, the disclosed lidstock provides better child resistant properties.

Figure 8:
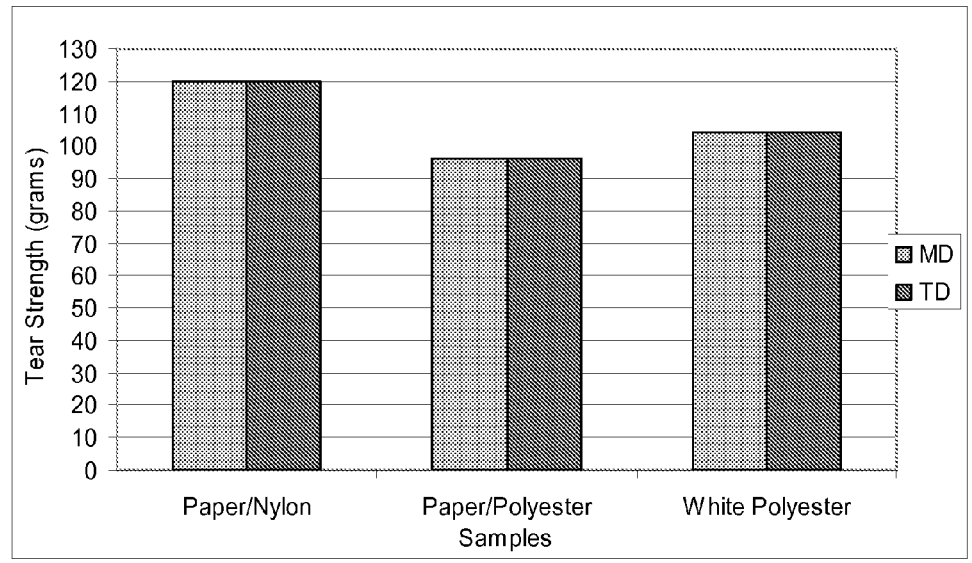
FIG. 8 illustrates the tear strength of the disclosed lidstock compared to traditional lidstocks.

The tear strength of samples of the disclosed and traditional lidstock materials was tested utilizing the Elmendorf Tear Test. The average force is calculated from the energy lost while tearing the test specimen. Tear direction is either in the machine direction (MD) or transverse direction (TD). Samples of the white polyester, traditional polyester and nylon lidstocks were tested using the Elmendorf Tear Test. FIG. 8 illustrates the tear strength for the various samples.

As seen from FIG. 8, the tear strength of the disclosed lidstock is about 104 grams. This is comparable to the tear strength of the tear strength of the traditional polyester and nylon lidstocks, having a tear strength of about 120 and 96 grams respectively.

Figure 9:
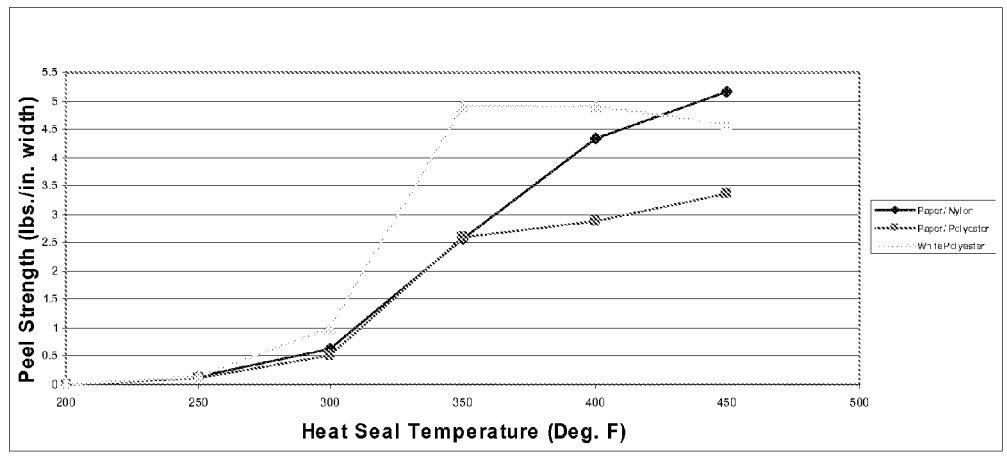
FIG. 9 illustrates the peel strength at various temperatures of the disclosed lidstock compared to traditional lidstocks when sealed at 40 psi for about 0.2 seconds.
Figure 10:
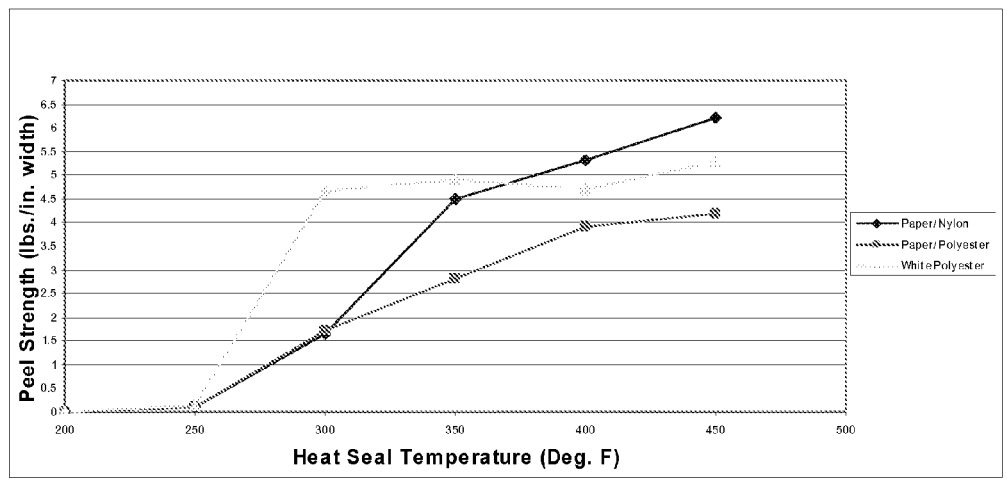
FIG. 10 illustrates the peel strength at various temperatures of the disclosed lidstock compared to traditional lidstocks when sealed at 40 psi for about 0.5 seconds.

In an exemplary embodiment, the disclosed lidstock material has a broader sealing window than with traditional pharmaceutical blisters lids. Samples of the white polyester, the traditional polyester, and the traditional nylon lidstocks were heat sealed to poly-vinyl chloride at various temperatures. The peel strength was then measured to determine the strength of the seal. FIG. 9 shows the peel strength of the samples when sealed for 0.2 seconds at 40 psi at different temperatures. FIG. 10 shows the peel strength of the samples when sealed for 0.5 seconds at 40 psi at different temperatures.

As seen in FIGS. 9 and 10, the lidstock having the white polyester layer has a much higher peel strength at lower temperatures than the traditional polyester and nylon lids. Accordingly, lower temperatures are needed to seal the lidstock to the blister pack. In a exemplary embodiment, the lidstock would be sealed to the blister pack at about 300° F. As a result, less damage is done to the structure of the lidstock and blister pack, and the errors in sealing are reduced. Additionally, less energy is required to manufacture the product, resulting in a more efficient and cost effective packaging.

In exemplary embodiments, the disclosed lidstock material is manufactured utilizing lamination and coating. In the lamination process, the release adhesive is applied to the foil web by gravure cylinder coating. The adhesive is solvent based and the solvent is removed by taking the foil through an oven. In particular embodiments, oven temperatures are set at about 150-180° F. to remove the solvent.

The heat seal is then applied to the foil by gravure cylinder coating. The heat seal is solvent based and the solvent is removed by taking the foil through an oven. In particular embodiments, oven temperatures are set at about 275° F. to remove the solvent.

While the above description contains many particulars, these should not be considered limitations on the scope of the disclosure, but rather a demonstration of embodiments thereof. The lidstock material and uses disclosed herein include any combination of the different species or embodiments disclosed. Accordingly, it is not intended that the scope of the disclosure in any way be limited by the above description. The various elements of the claims and claims themselves may be combined any combination, in accordance with the teachings of the present disclosure, which includes the claims.

What is claimed is:

1. A flexible lidstock material providing a lid to cover a blister sheet having one or more recesses each containing a pharmaceutical product, said flexible lidstock comprising:
   a) a first layer comprising a push-through resistant, flexible film of white polyester, wherein the white polyester comprises white pigment, having a top surface and an opposite bottom surface, said top surface providing a viewable printable surface for labeling said container;
   b) a second layer comprising an adhesive;
   c) a third layer comprising a flexible foil having a top surface and an opposite bottom surface, said second layer applied between and adhesively securing said first layer bottom surface to said third layer top surface; and
   d) a fourth layer comprising a heat seal disposed on said bottom surface of said third layer to allow said flexible lidstock material to be secured to the blister sheet, wherein the heat seal includes vinyl acrylic heat seal coating.

2. The lidstock material of claim 1 wherein the first layer has a thickness of about 0.002 inches.

3. The lidstock material of claim 1 wherein said first layer top surface includes a print primer.

4. The lidstock material of claim 1 wherein said second layer adhesive is a peelable release adhesive to allow said first layer to be peeled away from said third layer of the lidstock material, said third layer foil being breakable by manually pushing said pharmaceutical product therethrough.

5. The lidstock material of claim 4 wherein the peelable release adhesive has a weight of about 0.6 to 1.4 lbs per Ream.

6. The lidstock material of claim 1 wherein said second layer adhesive is a non-peelable release adhesive and said fourth layer heat seal is a peelable heat seal coating to allow the first, second, and third layers to be peeled away all at once as a single unit from said blister sheet.

7. The lidstock material of claim 1 wherein said second layer adhesive is a non-peelable release adhesive and said fourth layer heat seal is a non-peelable heat seal coating whereby a tool is required to access the pharmaceutical product located in a respective recess.

8. The lidstock material of claim 1 wherein the foil includes a 1200 series aluminum alloy.

9. The lidstock material of claim 8 wherein the aluminum foil alloy is O or H temper.

10. The lidstock material of claim 1 wherein the lidstock material has a Mullen burst strength of about 135-145 pounds per square inch.

11. The lidstock material of claim 1 wherein the lidstock material has a puncture strength of about 45-55 pounds.

12. A child resistant pharmaceutical blister package comprising:
   a) a base sheet having a plurality of blisters each having a perimeter and formed in the base sheet to contain a pharmaceutical product in a respective blister; and
   b) a flexible lidstock material providing a lid disposed on the base sheet to cover the pharmaceutical product in said plurality of blisters, said flexible lidstock material comprising:
      i) a heat seal layer disposed at said perimeters of said blisters on the base sheet, wherein the heat seal layer includes vinyl acrylic heat seal coating;
      ii) a flexible foil layer disposed on the heat seal layer;
      iii) an adhesive layer disposed on the foil layer opposite said heat seal layer; and
      iv) a push-through resistant, flexible film layer of white polyester, wherein the white polyester comprises white pigment, disposed on the adhesive layer opposite said foil layer, said film layer of white polyester having a viewable printable surface located opposite said foil layer for labeling said blister pack.

13. The pharmaceutical blister pack of claim 12 wherein the base sheet comprises poly-vinyl chloride.

14. The pharmaceutical blister pack of claim 12 wherein the film layer of white polyester has a thickness of about 0.002 inches.

15. The lidstock material of claim 12 wherein the film layer of white polyester includes a primer applied to said viewable printable surface of the film layer of white polyester.

16. The pharmaceutical blister pack of claim 12 wherein the adhesive layer comprises a peelable release adhesive having a weight of about 0.6 to 1.4 lbs per Ream.

17. The pharmaceutical blister pack of claim 12 wherein the foil layer includes a 1200 series aluminum alloy.

18. The pharmaceutical blister pack of claim 17 wherein the aluminum foil alloy is O or H temper.

19. The pharmaceutical blister pack of claim 12 wherein the lidstock material has a Mullen burst strength of about 135-145 pounds per square inch.

20. The pharmaceutical blister pack of claim 12 wherein the lidstock material has a puncture strength of about 45-55 pounds.

21. The pharmaceutical blister pack of claim 12 wherein said adhesive is a peelable adhesive and access to the pharmaceutical product is achieved by peeling away the film layer of white polyester and manually pushing the pharmaceutical product through the remaining lidstock material.

22. The pharmaceutical blister pack of claim 12 wherein a peel strength of a seal formed between the lidstock material and the base sheet is at least 4.0 lbs/in.width after the lidstock material is sealed to the base sheet for about 0.2 seconds at 40 psi at 350 degrees F.

23. The pharmaceutical blister pack of claim 12 wherein a peel strength of a seal formed between the lidstock material and the base sheet is at least 4.0 lbs/in.width after the lidstock material is sealed to the base sheet for about 0.5 seconds at 40 psi at 300 degrees F.

24. A flexible lidstock material providing a lid for a blister package, said flexible lidstock material consisting essentially of:
 a heat seal layer including vinyl acrylic heat seal coating;
 a foil layer disposed on the heat seal layer;
 an adhesive layer disposed on the foil layer opposite the heat seal layer; and
 a film layer of white polyester, wherein the white polyester comprises a white pigment, disposed on the adhesive layer opposite the foil layer,
 wherein the adhesive layer comprises a peelable release adhesive allowing the film layer of white polyester to be peeled away from the remaining lidstock material.

25. The lidstock material of claim 24 wherein a peel strength of a seal between the lidstock material and the blister package is at least 4.0 lbs/in. width after the lidstock material is sealed to the blister package for about 0.2 seconds at 40 psi at 350 degrees F.

* * * * *